United States Patent
Dandekar et al.

(10) Patent No.: US 9,989,435 B2
(45) Date of Patent: Jun. 5, 2018

(54) ELECTRICALLY CONDUCTIVE POLYMERS AS SENSING MEDIA TO DETECT LEAKS IN AEROSPACE PNEUMATIC DUCTS

(71) Applicant: EATON CORPORATION, Cleveland, OH (US)

(72) Inventors: Chinmaya Rajiv Dandekar, Pune (IN); Kartikeya Mahalatkar, Pune (IN); Manoj Kumar Verma, Behraich (IN); Soumayajit Sarkar, Farmington Hills, MI (US); Kenneth G. Phaneuf, Chelsea, MI (US); Javed Abdurrazzaq Mapkar, Farmington Hills, MI (US)

(73) Assignee: Eaton Intelligent Power Limited, Dublin (IE)

( * ) Notice: Subject to any disclaimer, the term of this patent is extended or adjusted under 35 U.S.C. 154(b) by 137 days.

(21) Appl. No.: 15/036,125

(22) PCT Filed: Nov. 14, 2014

(86) PCT No.: PCT/US2014/065760
§ 371 (c)(1),
(2) Date: May 12, 2016

(87) PCT Pub. No.: WO2015/073861
PCT Pub. Date: May 21, 2015

(65) Prior Publication Data
US 2016/0273995 A1    Sep. 22, 2016

Related U.S. Application Data

(60) Provisional application No. 61/904,828, filed on Nov. 15, 2013.

(51) Int. Cl.
*G01M 3/00* (2006.01)
*G01M 3/18* (2006.01)

(52) U.S. Cl.
CPC ............. *G01M 3/18* (2013.01); *G01M 3/002* (2013.01); *G01M 3/182* (2013.01)

(58) Field of Classification Search
CPC .......... G01M 3/00; G01M 3/002; G01M 3/18; G01M 3/182
See application file for complete search history.

(56) References Cited

U.S. PATENT DOCUMENTS 3,588,689 A    6/1971   Crawford
3,721,898 A *  3/1973   Dragoumis ........... G01M 3/045
                                                    138/104

(Continued)

FOREIGN PATENT DOCUMENTS

CN    103267616 A      8/2013
EP    0028142 A1 *    5/1981   ............... G01K 3/00

(Continued)

OTHER PUBLICATIONS

European Patent Office; International Search Report and Written Opinion issued in counterpart International Application No. PCT/US2014/065760. dated Feb. 17, 2015.

*Primary Examiner* — Nguyen Ha
(74) *Attorney, Agent, or Firm* — Fishman Stewart PLLC

(57) ABSTRACT

A leak detection system for a high-temperature aerospace fluid duct may include a rigid metal fluid duct, an electrically conductive polymer disposed around the high-temperature fluid duct, the conductive polymer configured to melt in response to a leak of high-temperature fluid from the high-temperature fluid duct. The system may include a sensor configured to monitor at least one electrical characteristic of the electrically conductive polymer. The system may include a layer of insulation disposed between the electrically conductive polymer and the high-temperature fluid duct.

25 Claims, 6 Drawing Sheets

(56) References Cited

U.S. PATENT DOCUMENTS

| | | | | |
|---|---|---|---|---|
| 4,487,057 A | * | 12/1984 | Lutz | G01K 3/00 174/11 R |
| 4,691,741 A | | 9/1987 | Affa et al. | |
| 5,159,276 A | * | 10/1992 | Reddy | G01M 3/165 174/11 R |
| 5,203,202 A | * | 4/1993 | Spencer | G01M 3/165 73/40 |
| 5,262,120 A | | 11/1993 | Bretagne | |
| 5,294,909 A | | 3/1994 | Frazier | |
| 6,265,880 B1 | | 7/2001 | Born et al. | |
| 7,042,235 B2 | * | 5/2006 | Strackbein | G01M 3/18 324/686 |
| 7,752,904 B2 | | 7/2010 | Krutz et al. | |
| 7,782,062 B2 | | 8/2010 | Bier | |
| 7,977,952 B2 | | 7/2011 | Krutz et al. | |
| 8,211,518 B2 | | 7/2012 | Fernandes et al. | |
| 2002/0189326 A1 | * | 12/2002 | Jang | G01M 3/002 73/40 |
| 2003/0094033 A1 | * | 5/2003 | Gibbs | G01M 3/16 73/40 |
| 2010/0174495 A1 | * | 7/2010 | Pereira | F16L 11/127 702/34 |
| 2012/0170610 A1 | * | 7/2012 | Ramos | G01M 3/002 374/5 |
| 2012/0247597 A1 | | 10/2012 | Millet et al. | |
| 2013/0134992 A1 | * | 5/2013 | Zhu | G01M 3/18 324/658 |
| 2013/0154666 A1 | | 6/2013 | Albaladejo et al. | |
| 2013/0181728 A1 | * | 7/2013 | Strohmer | F16L 9/125 324/693 |

FOREIGN PATENT DOCUMENTS

| | | | |
|---|---|---|---|
| GB | 2433298 A | 6/2007 | |
| JP | 2000230880 A | 8/2000 | |
| WO | WO 2013022165 A1 * | 2/2013 | G01M 3/165 |

* cited by examiner

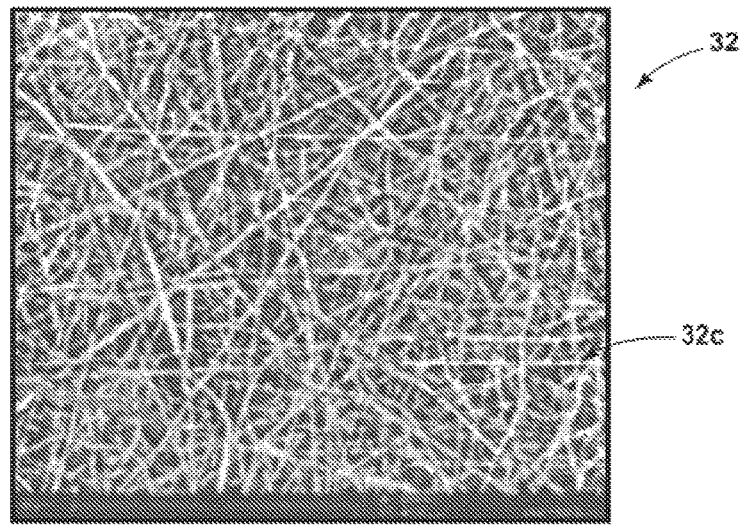
FIG. 3
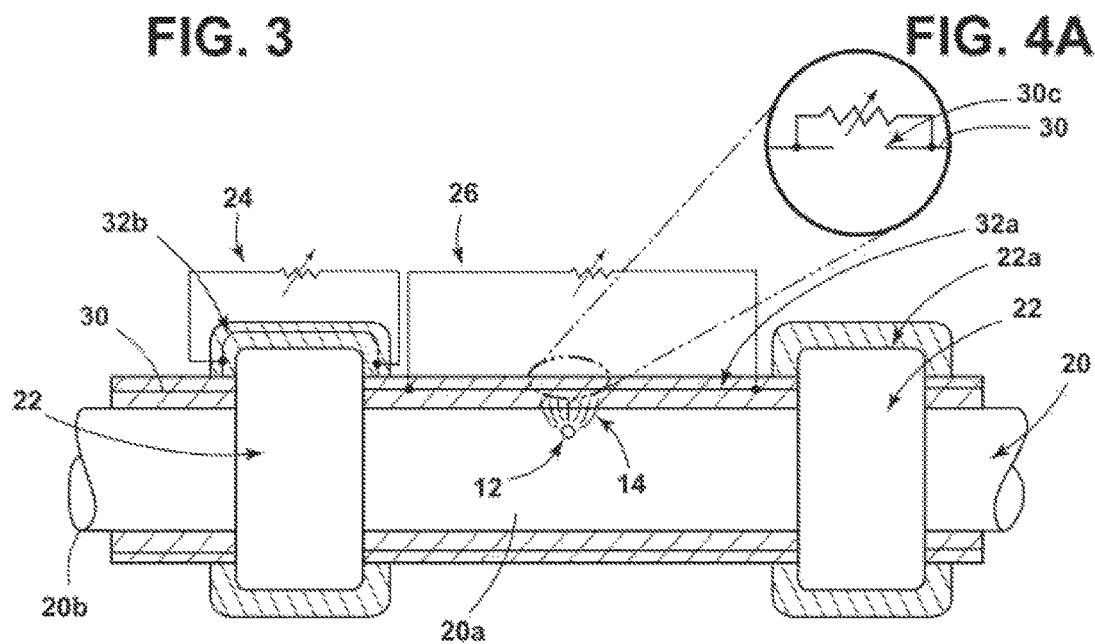
FIG. 4A
FIG. 4

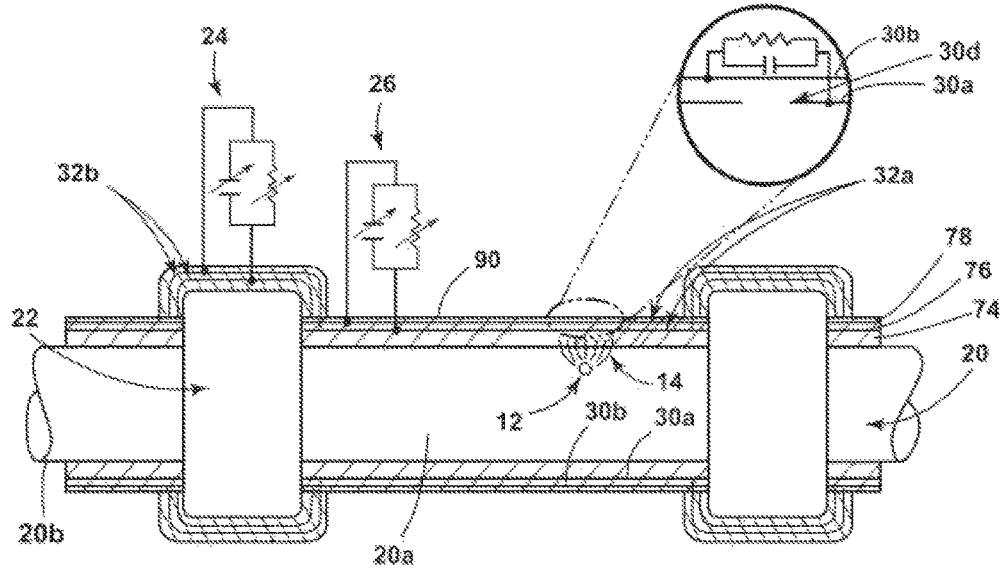
FIG. 5
FIG. 5A
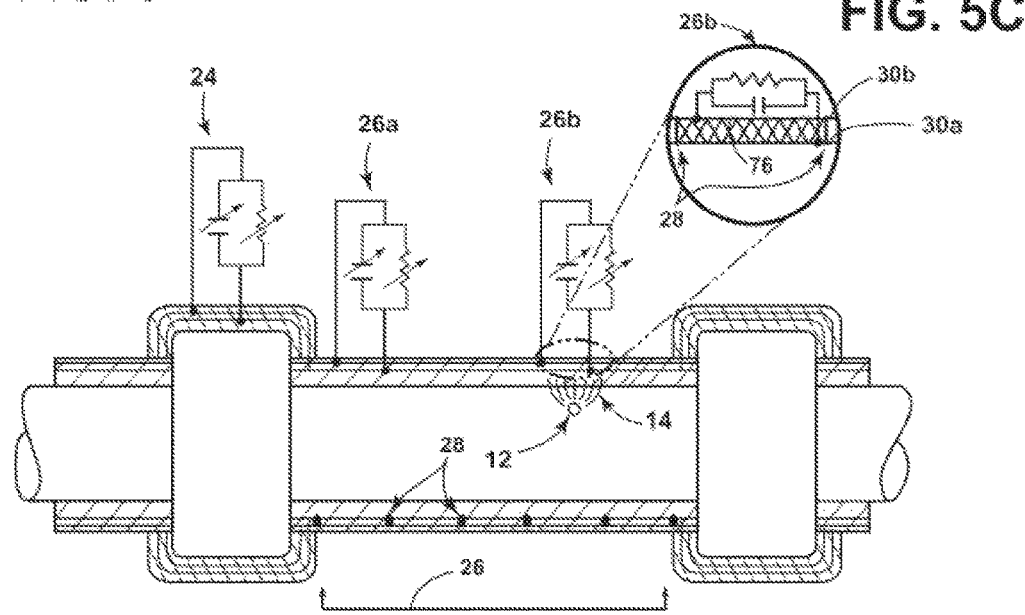
FIG. 5B
FIG. 5C

ELECTRICALLY CONDUCTIVE POLYMERS AS SENSING MEDIA TO DETECT LEAKS IN AEROSPACE PNEUMATIC DUCTS

CROSS REFERENCE TO RELATED APPLICATION

This application is a national stage filing based upon International PCT Application No. PCT/US2014/065760, with an international filing data of Nov. 14, 2014, which claims the benefit of priority to U.S. Provisional application No. 61/904,828 filed Nov. 15, 2013, the entire disclosures of which are hereby incorporated by reference as though fully set forth herein.

TECHNICAL FIELD

The present disclosure relates to leak detection systems including leak detection systems suitable for high-temperature aerospace pneumatic ducts. The present disclosure also relates to insulation materials used in connection with high-temperature pneumatic ducts.

BACKGROUND

Conventional leak detection systems typically may have certain drawbacks, which may include delayed leak response times and/or incompatibility with high-temperature environments.

SUMMARY

An embodiment of the present disclosure includes a leak detection system for high-temperature pneumatic ducts. In embodiments, a leak detection system for a high-temperature aerospace fluid duct may comprise a rigid metal fluid duct, an electrically conductive polymer disposed around the high-temperature fluid duct, the conductive polymer configured to melt in response to a leak of high-temperature fluid from the high-temperature fluid duct, a sensor configured to monitor at least one electrical characteristic of the electrically conductive polymer, and a layer of insulation disposed between the electrically conductive polymer and the high-temperature fluid duct.

In embodiments, a method of detecting leaks in a high-temperature aircraft fluid duct may comprise monitoring at least one electrical characteristic of an electrically conductive polymer, the electrically conductive polymer disposed around a fluid duct, wherein the at least one electrical characteristic has a first value before a leak of high-temperature fluid occurs and a second value after the high-temperature leak occurs, a difference between the first value and the second value resulting at least partially from the electrically conductive polymer melting as a result of the high-temperature fluid leak.

BRIEF DESCRIPTION OF THE DRAWINGS

FIG. 3 is an enlarged view generally illustrating a portion of an electrically conductive polymer, in accordance with an embodiment of the present disclosure.

FIG. 4 is a is a cross-sectional view generally illustrating a leak detection system, in accordance with an embodiment of the present disclosure.

FIG. 4A is an enlarged view generally illustrating a portion of a leak detection system, in accordance with an embodiment of the present disclosure.

FIG. 5 is a is a cross-sectional view generally illustrating a leak detection system, in accordance with an embodiment of the present disclosure.

FIG. 5A is an enlarged view generally illustrating a portion of a leak detection system, in accordance with an embodiment of the present disclosure.

FIG. 5B is a is a cross-sectional view generally illustrating a leak detection system, in accordance with an embodiment of the present disclosure.

FIG. 5C is an enlarged view generally illustrating a portion of a leak detection system, in accordance with an embodiment of the present disclosure.

DETAILED DESCRIPTION

Figure 1:
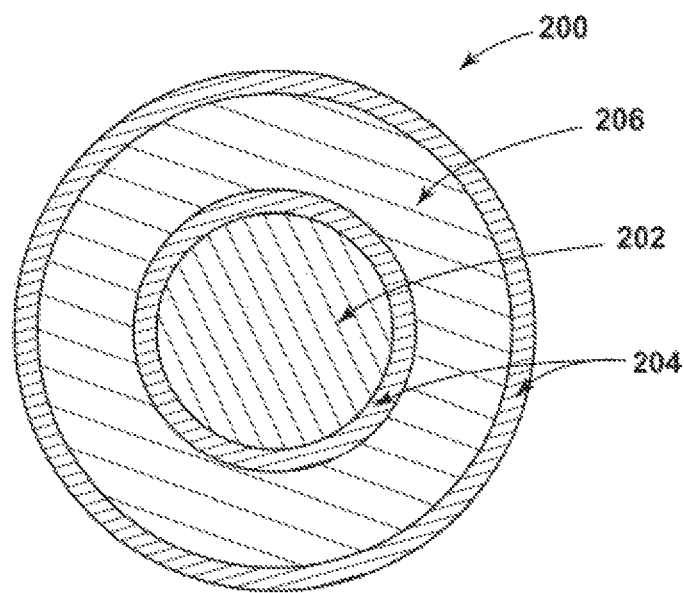
FIG. 1 is a cross-sectional view generally illustrating an embodiment of an air duct.

Referring now to the drawings, an aircraft air duct assembly 200 is generally illustrated in FIG. 1. Air duct assemblies 200 may include an air duct 202, layers of metal foil 204 arranged around the air duct 202, and a layer of solid insulation 206 arranged between the layers of metal foil 204. Layer of solid insulation 206 may be used to thermally insulate components in proximity to the air duct 202 from the potentially extremely high temperatures of fluid flowing through the air duct 202. Such temperatures may, for example, exceed 500 degrees Celsius or 650 degrees Celsius, or even higher.

Detecting a leak in an air duct 202 containing such high-temperature fluid may also be desirable in protecting components in proximity to the duct 202. Leak detection systems use individual temperature sensors spaced along the length of an air duct 202. However, these temperature sensors may be located at a significant distance from an actual leak, creating a delay between when the leak occurs and when the leaking fluid actually causes the temperature sensed by the temperature sensors to rise. Such a delay may result in considerable amounts of high-temperature fluid leaking out of the air duct 202, potentially causing damage to nearby components.

Figure 2:
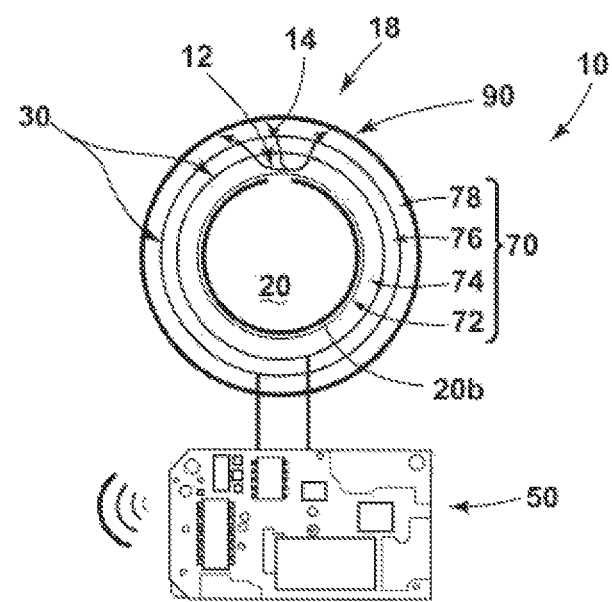
FIG. 2 is a cross-sectional view generally illustrating a leak detection system, in accordance with an embodiment of the present disclosure.

As generally illustrated in FIG. 2, an embodiment of the present disclosure includes a leak detection system 10 that may include a duct assembly 18 and a monitoring unit 50. Duct assembly 18 may include a duct 20, one or more conducting layers 30, one or more intermediate layers 70, and/or a cover 90. Conducting layers 30 may be connected to monitoring unit 50.

In embodiments, duct 20 may include one or more materials, shapes, sizes, and/or configurations. In embodiments, duct 20 may include one or more materials, which may include metals, configured to withstand extreme conditions, such as extreme temperatures and/or corrosive materials. For example, and without limitation, duct 20 may include Inconel® 718, Inconel® 625, titanium alloy, stainless steel, aluminum, and/or other desired materials. Duct 20 may be flexible and/or rigid. For example, duct 20 may be a rigid metal duct. As generally illustrated in FIG. 4, duct 20 may include joints 22 that connect two or more portions of duct 20 together. For example, duct 20 may include one or more joints 22 that may be configured as gimbal joints and/or universal joints. Joints 22 may connect one or more portions (e.g., rigid metal portions) of duct 20 together. It should be understood that portions of duct 20 may also be connected by other suitable joint and/or may be connected by more than one type of joint.

Figure 6:
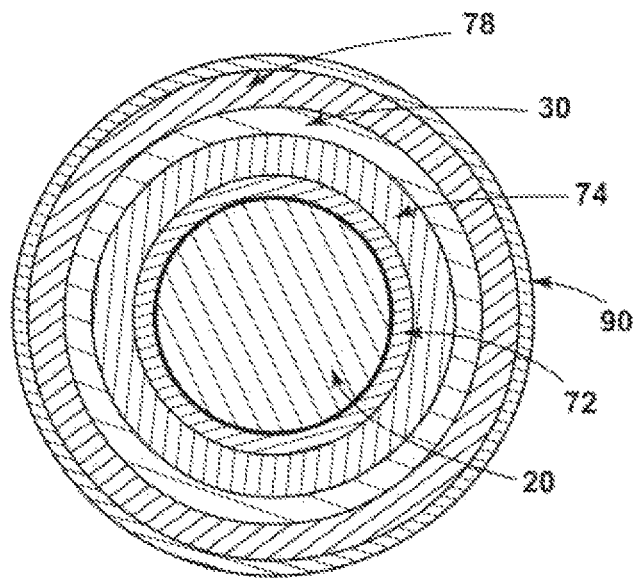
FIG. 6 is a is a cross-sectional view generally illustrating a leak detection system, in accordance with an embodiment of the present disclosure.

As generally illustrated in FIGS. 2 and 6, a first intermediate layer 72 may be arranged around the outside of duct 20. First intermediate layer 72 may include one or more layers, which may include an insulating material and/or may include metal foil. Insulating material may thermally insulate other layers (e.g., conducting layers 30, cover 90, etc.) from the potentially extremely high temperature of the outer surface 20b of duct 20, which may exist during normal operating conditions (e.g., when there is no leak 12). Such thermal insulating may reduce the maximum temperature that other layers (e.g., conducting layers 30, cover 90, etc.) may need to withstand during normal operating conditions.

In embodiments, one or more conducting layers 30 may be disposed partially and/or entirely around an outer perimeter of duct 20, which may or may not include being disposed over axial ends of duct 20. In embodiments, conducting layers 30 may be disposed around all or part of first intermediate layer 72. As generally illustrated in FIGS. 3 and 4, in embodiments, a conducting layer 30 may include an electrically conductive polymer 32. It should be understood that references that may be made herein to "conducting layer" 30 and/or "conducting layers" 30 are intended to cover embodiments including a single conducting layer and embodiments including more than one conducting layer.

In embodiments, electrically conductive polymer 32 may be developed by reinforcing a thermoplastic polymer with conductive fillers such as carbon-based nanomaterials and microfillers. Fillers mays include carbon nanotubes, carbon nanofibers, graphene, graphite, carbon black, carbon fibers, and/or other similar materials. The thermoplastic polymer may, additionally or alternatively, be reinforced with one or more metals, such as silver and/or nickel nano and/or micro particles. Additionally or alternatively, electrically conductive polymer 32 may include materials that are at least partially inherently electrically conductive, such as polyaniline, polypyrrole, polyethylene-dioxythophene, and/or other similar materials. Electrically conductive polymer 32 may, additionally or alternatively, include one or more of polyolefin, polyamide, polycarbonate, poly sulfones, polyimides, polyetheretherketones, polyamideimide, polyetherimide, fluoropolymers, epoxies, esters, silicones, liquid crystal polymers, polyvinyl alcohol (PVA), individually or in combination with other polymers (e.g., a polymer alloy) and/or any other desired materials. Electrically conductive polymer 32 may include a film and/or may include a fiber mesh 32c (see, e.g., FIG. 3). Fiber mesh 32c may be created via electrospinning and/or forcespinning.

In embodiments, properties of conducting layer 30 may vary depending on the composition of electrically conductive polymer 32. In embodiments, conducting layer 30 may include an electrically conductive polymer 32 that may include a relatively uniform composition throughout its volume. In embodiments, conducting layer 30 may include two or more electrically conductive polymers (e.g., first conductive polymer 32a, second conductive polymer 32b), at least one of which may include a different composition than at least one other electrically conductive polymer 32. For example, and without limitation, a first electrically conductive polymer 32a may include a first composition with a first melting point and a second electrically conductive polymer 32b may include a second composition with a second melting point. The second melting point may be higher than the first melting point. Such a configuration having multiple compositions may be desirable for certain applications. For example, the outer surface 22a of joint 22 of duct 20 may reach higher temperatures than the outer surface 20b of body portion 20a of duct 20, so it may be desirable for an electrically conductive polymer 32 with a higher melting point (e.g., second electrically conductive polymer 32b) to be disposed at, around, and/or near joint 22 to accommodate the higher temperatures. It may also be desirable to dispose an electrically conductive polymer 32 with a lower melting point (e.g., first electrically conductive polymer 32a) at and/or near body portion 20a (or other portions that are expected to experience lower temperatures), as an electrically conductive polymer with a lower melting point may be less costly and/or exhibit certain desirable physical and/or electrical properties.

In embodiments, electrical properties of conducting layer 30 may vary depending on a number of factors, such as, without limitation, the composition of electrically conductive polymer 32, the volume of electrically conductive polymer 32, and/or the temperature of electrically conductive polymer 32. For example, conducting layer 30 may include an resistance per unit length (e.g., ohms/km) and/or a total resistance. A nominal total resistance of conducting layer 30 may be calculated by multiplying the resistance per unit length by the longitudinal length of conducting layer 30. An actual total resistance of conducting layer 30 may be measured and/or monitored by a sensor, such as sensor 52.

Figure 8:
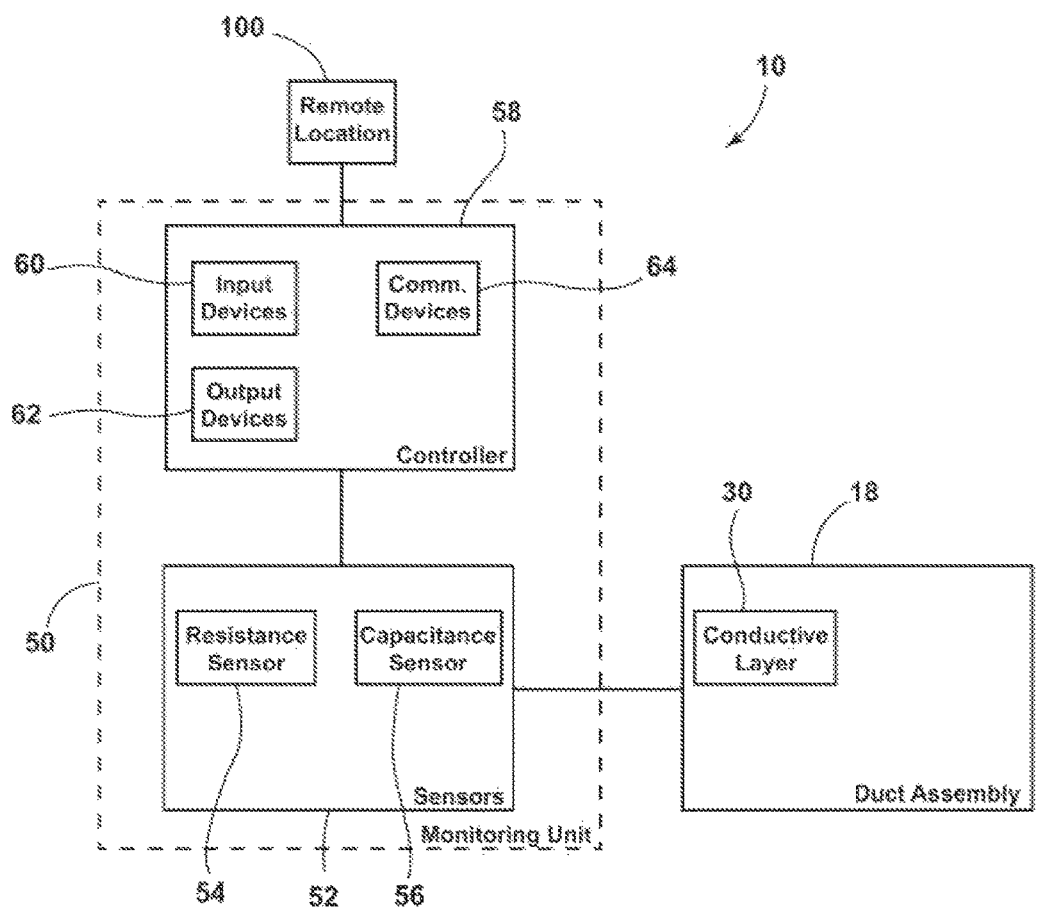
FIG. 8 is a schematic view generally illustrating a leak detection system, in accordance with an embodiment of the present disclosure.

As generally illustrated in FIG. 8, in embodiments, leak detection system 10 may include one or more components, which may be separate from, connected to, and/or incorporated into monitoring unit 50. Such components may include one or more sensors 52, controllers 58, input devices 60, output devices 62, communication devices 64, and/or other desired components. Communication devices 64 may include, without limitation, wireless transmitters, receivers, and/or transceivers, and may be configured to communicate wirelessly and/or via a wired connection.

In embodiments, sensor 52 may include a one or more sensors (e.g., resistance sensor 54 and/or capacitance sensor 56), and may be connected to and/or be incorporated into monitoring unit 50. Sensor 52 may be configured to monitor and/or measure electrical characteristics of leak detection system 10 and/or any other desired characteristic that may be related to leak detection system 10.

In embodiments, leak detection system 10 may include resistance sensor 54, which may be configured to monitor and/or measure the total resistance of conducting layer 30. In the event of a leak 12, the total resistance of conducting layer 30 may change as conducting layer 30 is exposed to higher temperatures resulting from, for example, leaking high-temperature fluid 14 contacting conducting layer 30. Leaking high-temperature fluid 14 may have a sufficiently high temperature to cause at least a portion of conducting layer 30 to melt (e.g., portion 30c), which may result in a change in the actual total resistance of conducting layer 30. Melting may include at least a partial phase transition of portions of electrically conductive polymer 32 from a generally solid phase to a generally liquid phase, and/or may include conducting layer 30 changing shape as a result of a temperature increase. Melting may begin at or near (e.g., slightly above and/or slightly below) the melting point of conducting layer 30 and/or electrically conductive polymer 32. For example, and without limitation, leaking high-temperature fluid 14 may melt portion 30c of conducting layer 30, which may effectively decrease the cross-sectional area of conducting layer 30, which may increase the total resistance of conducting layer 30. Thus, a change in resistance may result from a change in temperature of the conducting layer 30 and/or the melting of at least a portion of conducting layer 30.

In embodiments, controller 58 may comprise a programmable microprocessor and/or microcontroller, and/or may include, for example, an application specific integrated circuit (ASIC). Controller 58 may include a central processing unit (CPU), memory, and/or an input/output (I/O) interface. Controller 58 may be configured to perform various functions, including those described in greater detail herein, with appropriate programming instructions and/or code embodied in software, hardware, and/or other medium.

Monitoring unit 50 may be configured to monitor resistance sensor 54 and/or detect a leak 12 if the change in total resistance of the conducting layer 30 exceeds a certain defined or threshold level. The threshold level may be configured to accommodate expected and/or unexpected fluctuations in the total resistance of conducting layer 30. For example, and without limitation, the defined or threshold level may be configured to accommodate for total resistance changes resulting from expected changes in environmental and/or operating conditions (e.g., changes in temperature that may result from changes in aircraft engine speed, altitude, etc.).

As generally illustrated in FIGS. 5 and 6, in embodiments, leak detection system 10 may include more than one conducting layer (e.g., conducting layers 30a and 30b). Conducting layers 30a and 30b may be separated (e.g., radially) by a gap and/or may act as a capacitor having a capacitance. In embodiments, an intermediate layer (e.g., third intermediate layer 76) may be disposed between conducting layer 30a and conducting layer 30b (e.g., in the gap). The capacitance may be a function of the size of the area that conducting layer 30a and conducting layer 30b overlap (e.g., in an axial/lengthwise direction) with each other and/or the separation between layer 30a and layer 30b (which may correspond to the thickness of third intermediate layer 76). In the event of a leak, leaking high-temperature fluid 14 may reduce the overlap area, which may decrease the capacitance. In embodiments, a total resistance of conducting layers 30a, 30b may correspond to the resistance of conducting layer 30a and the resistance of conducting layer 30b. Conducting layers 30a, 30b may include respective surface areas (e.g., a product of length, width, and height, and/or a product of circumference and length). In the event of a leak, melting of one or both conducting layers 30a, 30b may reduce the respective surface areas.

In embodiments, conducting layers 30a, 30b may include generally the same material composition (e.g., the same conductive polymer), which may include having generally the same melting point. In other embodiments, conducting layer 30a may include a different material composition than conducting layer 30b. Conducting layer 30a may be disposed closer (e.g., radially) to duct 20 than conducting layer 30b, and/or conducting layer 30a may be exposed to higher normal operating temperatures. Conducting layer 30a may have a relatively high melting point, which may prevent conducting layer 30a from melting at normal operating temperatures. Conducting layer 30b may be disposed farther (e.g., radially) from duct 20 than conducting layer 30a and/or may be exposed to lower normal operating temperatures than conducting layer 30a. Conducting layer 30b may include a lower melting point than conducting layer 30a.

In embodiments, leak detection system 10 may include capacitance sensor 56 that may be configured to monitor and/or measure the capacitance of conducting layers 30a, 30b. In the event of a leak, the capacitance of conducting layers 30a, 30b may change as at least one of the conducting layers 30a, 30b may exposed to higher temperatures resulting from, for example, leaking high-temperature fluid 14 contacting conducting layer 30. Leaking high-temperature fluid 14 may have a sufficiently high temperature to cause at least a portion (e.g., portion 30d) of at least one of conducting layers 30a, 30b and/or electrically conductive polymer 32 to melt, which may result in a change in the total capacitance of conducting layer 30. Thus, a change in capacitance may result from a change in temperature of the conducting layer 30 and/or the melting of at least a portion of conducting layer 30.

Monitoring unit 50 may be configured to monitor capacitance sensor 56 and/or detect a leak 12 if a change in capacitance of the conducting layers 30 exceeds a certain threshold level. The threshold level may be configured to accommodate expected and/or unexpected fluctuations in the total capacitance of conducting layer 30. For example, and without limitation, threshold level may be configured to accommodate for capacitance changes resulting from expected changes in environmental and/or operating conditions (e.g., reduced fluid temperature resulting from decreased aircraft engine speed, changes in altitude, etc.).

In embodiments, monitoring unit 50 may be configured to monitor resistance sensor 54 and capacitance sensor 56, and may be configured to detect a leak if a change in resistance and/or a change in capacitance exceeds a certain threshold level. Monitoring unit 50 may be configured to detect a leak if either a change in resistance or capacitance exceeds a certain threshold level and/or may be configured to detect a leak if a change in both resistance and capacitance exceeds a certain threshold level.

Figure 9:
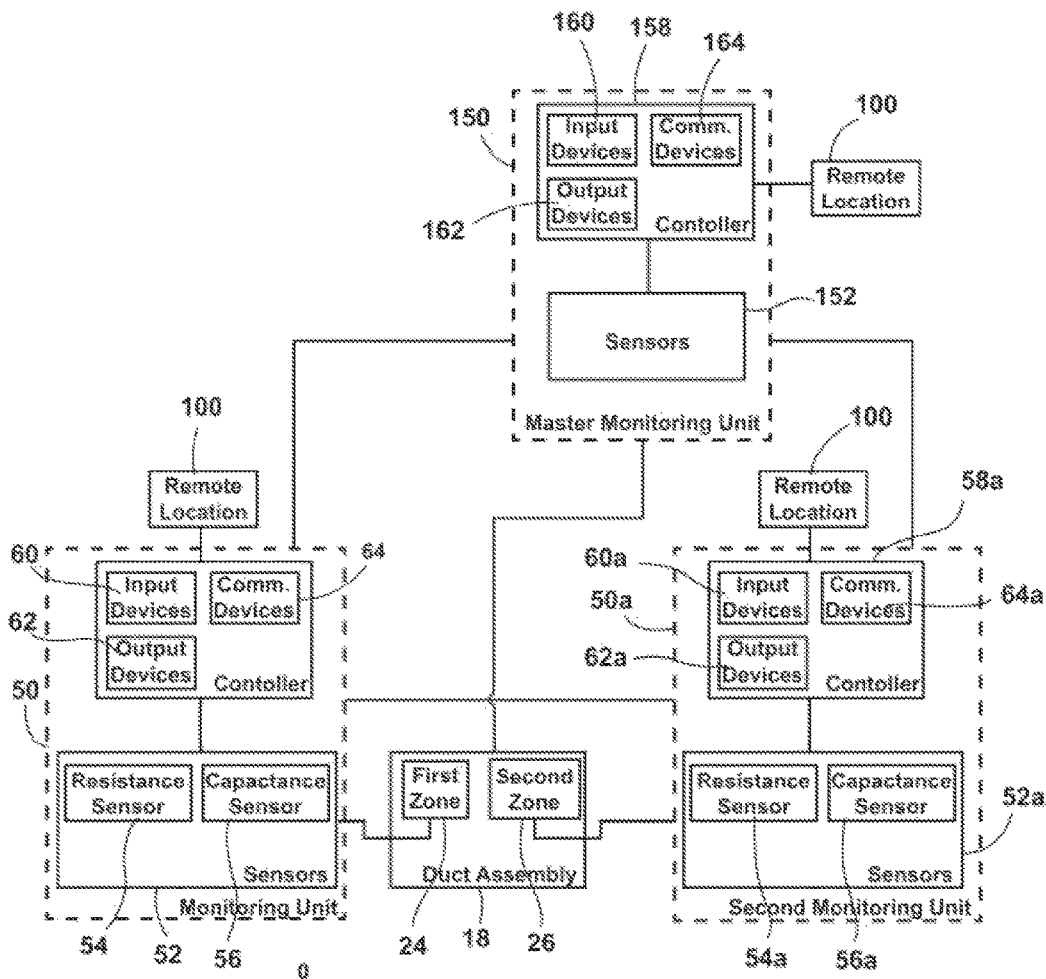
FIG. 9 is a schematic view generally illustrating a leak detection system, in accordance with an embodiment of the present disclosure.

In embodiments, leak detection system 10 may include one or more zones (e.g., first zone 24 and second zone 26). Each zone may be configured to detect leaks 12 in a particular section/portion of duct 20. Each zone may include a monitoring unit 50 and/or sensors 52. For example, as generally illustrated in FIG. 9, monitoring unit 50 may be connected to first zone 24 and leak detection system 10 may include a second monitoring unit 50a that may be connected to second zone 26. Monitoring unit 50a may be similar to monitoring unit 50. Monitoring unit 50a may include and/or may be connected to one or more sensors 52a (e.g., resistance sensor 54a, capacitance sensor 56a, etc.), controllers 58a, input devices 60a, output devices 62a, communication devices 64a, and/or any other desired component. Monitoring units 50, 50a may be configured to communicate with each other and/or with a remote location 100, such as a cockpit of an aircraft.

As generally illustrated in FIGS. 5B and 5C, a zone (e.g., second zone 26) may include one or more sections. For example, second zone 26 may include first section 26a and second section 26b. One or more monitoring units (e.g., monitoring unit 50a) may be configured to monitor the resistance and/or capacitance of conducting layers 30a, 30b of first section 26a and/or second section 26b. First section 26a may be separated from second section 26b by an insulating spacer 28. Insulating spacer 28 may be configured to thermally insulate first section 26a and second section 26b from each other.

In embodiments, insulating spacer 28 may allow a monitoring unit (e.g., monitoring units 50, 50a) to provide an indication of the severity of a leak. For example, and without limitation, if a sensed change in capacitance and/or resistance of first section 26a exceeds a certain threshold, a leak may be detected, but a sensed change (if any) in capacitance and/or resistance of second section 26b may not exceed a certain threshold. In such a leak situation, a monitoring unit may provide an indication that the leak is not as severe as a leak which causes the change in capacitance and/or resistance of both sections 26a, 26b to exceed certain thresholds.

As generally illustrated in FIGS. 5 and 6, embodiments of leak detection system 10 may include one or more intermediate layers 70. For example, and without limitation, leak detection system 10 may include a first intermediate layer 72, a second intermediate layer 74, a third intermediate layer 76, and/or a fourth intermediate layer 78. First intermediate layer 72 may include metal foil. First intermediate layer 72 may be arranged around all or part of the circumference and/or length of duct 20. First intermediate layer 72 may be entirely or partially arranged directly on outer surface 20b of duct 20 and/or entirely or partially arranged at a distance from outer surface 20b of duct 20.

Figure 7A:
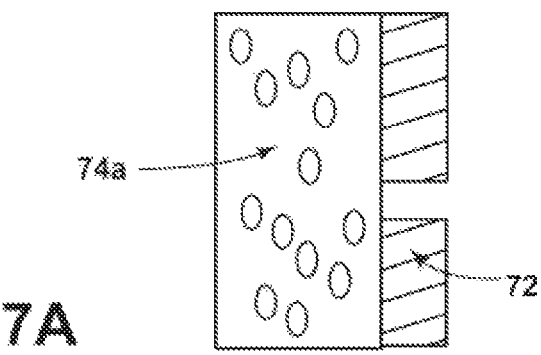
FIGS. 7A and 7B are cross-sectional views generally illustrating a conventional air duct and conventional insulation.
Figure 7B:
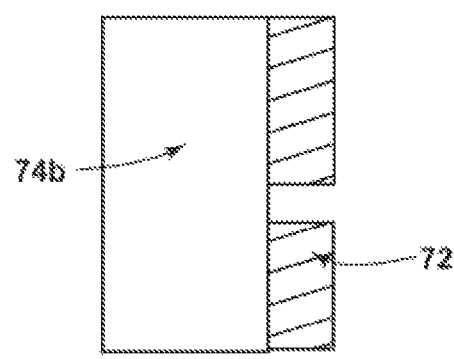

As generally illustrated in FIG. 6, second intermediate layer 74 may be disposed between first intermediate layer 72 and conducting layer 30 and/or conducting layer 30 may be arranged in second intermediate layer 74. Second intermediate layer 74 may be disposed at least partially in direct contact with duct 20 or second intermediate layer 74 may not be in direct contact with duct 20. Second intermediate layer 74 may include a highly porous material 74a, such as generally illustrated in FIG. 7A, and/or second intermediate layer 74 may include a solid insulation 74b, such as generally illustrated in FIG. 7B. Highly porous material 74a may include, without limitation, metallic and/or ceramic foam. For example, and without limitation, highly porous material 74a may include aluminum oxide, boron carbide, silicon nitride, silicon carbide, silicon nitride carbide, zirconium carbide, zirconium, aerogel, and/or any of individual elements of these materials. Aerogel may include a material derived from gel, in which the liquid component has been replaced by a gas. Aerogel may include numerous variations, including a polyimide-based aerogel.

In embodiments, highly porous material 74a may include a porosity of about 75%-95%. In embodiments, highly porous material 74a may, additionally or alternatively, include a permeability of about $10^{-4}$ to $10^{-7}$ cm$^2$. Highly porous material 74a may facilitate the flow of leaking high-temperature fluid 14 from duct 20 to conducting layers 30. Highly porous material 74a may allow heat from the leaking high-temperature fluid 14 to be transferred to the conducting layers 30 via convection and/or conduction, which may result in faster leak detection. Faster leak detection may result from electrical properties (e.g., resistance, capacitance, etc.) and/or or physical properties (e.g., conducting layer 30 may melt sooner as a result of a leak 12) of the conducting layer 30 changing sooner. Also, leaking high-temperature fluid 14 from duct 20 may contact conducting layer 30 sooner, which may also result in properties of conducting layers 30 changing sooner, potentially allowing for faster leak detection than if a material having a relatively lower porosity were used. Faster leak detection may allow corrective action (e.g., diverting fluid flow from the leaking duct 20) to be taken sooner, which may reduce and/or completely prevent damage to nearby components.

In embodiments, second intermediate layer 74 may thermally insulate conducting layers 30 from duct 20. Thermally insulating conducting layers 30 from duct 20 via second intermediate layer 74 may allow for the melting point of conducting layers 30 to be lower than in the absence of second intermediate layer 74. In embodiments, duct 20 and/or outer surface 20b may be expected to reach maximum temperatures of at least 500 degrees Celsius, 650 degrees Celsius, or even higher. Second intermediate layer 74 may permit the melting point of conducting layers 30 to be below the expected maximum surface temperatures of outer surface 20b.

In embodiments, third intermediate layer 76 may be arranged between conducting layer 30a and conducting layer 30b. In embodiments, third intermediate layer 76 may include solid insulation and/or highly porous material, which may be similar to or the same as highly porous material 74a. Third intermediate layer 76 may include a polymer and/or a polymer alloy. Physical and/or electrical properties of third intermediate layer 76 may be configured to change in response to changes in its temperature. For example, and without limitation, third intermediate layer 76 may act as a dielectric between conducting layers 30a, 30b. In the event of a leak, leaking high-temperature fluid 14 may increase the temperature of and/or melt third intermediate layer 76, which may alter a capacitance monitored by a monitoring unit (e.g., monitoring unit 50) and indicate a leak.

In embodiments, fourth intermediate layer 78 may be arranged around conducting layer 30. Fourth intermediate layer 78 may include dielectric and/or insulating material. Fourth intermediate layer 78 may include solid insulation and/or highly porous material, which may be similar to or the same as highly porous material 74a.

In embodiments, cover 90 may be arranged around the conducting layer 30 and/or fourth intermediate layer 78. Cover 90 may include silicon and/or glass fibers, metallized polyvinyl tape, and/or foil (e.g., 0.003 inch thick stainless steel). Cover 90 may provide physical protection to leak detection system 10.

Additionally or alternatively, as generally shown in FIG. 9, leak detection system 10 may include a master monitoring unit 150 configured to monitor one or more zones of duct 20 (e.g., first zone 24, second zone 26). Master unit 150 may monitor duct 20 directly and/or via monitoring units 50, 50a. Master monitoring unit 150 may include, monitor, and/or be connected to monitoring units 50, 50a. Master monitoring unit 150 may include one or more sensors 152, controllers 158, input devices 160, output devices 162, communication devices 164, and/or other desired components. Master monitoring unit 150 and/or monitoring units 50 may be configured to communicate with a remote location. For example, and without limitation, master monitoring unit 150 may be configured to send a signal to a remote location 100 (e.g., a cockpit) to indicate that a leak 12 has been detected and/or to indicate in which zone a leak 12 has been detected.

In embodiments, master monitoring unit 150 may be configured to provide an indication of the severity of a leak. For example, and without limitation, master monitoring unit 150 may provide an indication of a minor leak if only one monitoring unit (e.g., one of monitoring unit 50 and monitoring unit 50a) indicates a leak. Master monitoring unit 150 may provide an indication of a major leak if a plurality of and/or all monitoring units (e.g., monitoring unit 50 and monitoring unit 50a) indicate a leak.

It should be understood that references to a single element are not so limited and may include one or more of such element.

Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present teachings not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A leak detection system for high-temperature aerospace fluid ducts, comprising:
   a rigid metal fluid duct;
   an electrically conductive polymer disposed around the rigid metal fluid duct, the electrically conductive polymer configured to melt in response to a leak of high-temperature fluid from the rigid metal fluid duct;
   a sensor configured to monitor at least one electrical characteristic of the electrically conductive polymer; and
   a layer of insulation disposed between the electrically conductive polymer and the rigid metal fluid duct;
   wherein the layer of insulation thermally insulates the electrically conductive polymer from the rigid metal fluid duct and the layer of insulation is configured to facilitate flow of high-temperature fluid from the leak to the electrically conductive polymer.

2. The leak detection system of claim 1, comprising a monitoring unit configured to monitor the sensor.

3. The leak detection system of claim 1, wherein the sensor includes at least one of a resistance sensor and a capacitance sensor.

4. The leak detection system of claim 1, comprising a layer of foil disposed between the layer of insulation and the rigid metal fluid duct.

5. The leak detection system of claim 1, wherein the electrically conductive polymer includes a first portion that is disposed around a first zone of the rigid metal fluid duct and the electrically conductive polymer includes a second portion that is disposed around a second zone of the rigid metal fluid duct.

6. The leak detection system of claim 5, wherein the first portion of the electrically conductive polymer is disposed at least partially around a joint of the rigid metal fluid duct and the first portion includes a higher melting point than the second portion.

7. The leak detection system of claim 5, wherein the sensor is a first sensor and is configured to monitor the at least one electrical characteristic of the first portion of the electrically conductive polymer, and the leak detection system comprises a second sensor configured to monitor the at least one electrical characteristic of the second portion of the electrically conductive polymer.

8. The leak detection system of claim 7, comprising a first monitoring unit configured to monitor the first sensor and to provide an indication of the leak if a change in the at least one electrical characteristic monitored by the first sensor exceeds a first specified threshold, and comprising a second monitoring unit configured to monitor the second sensor and to provide an indication of the leak if a change in the at least one electrical characteristic monitored by the second sensor exceeds a second predetermined threshold.

9. The leak detection system of claim 8, comprising a master monitoring unit configured to monitor the first monitoring unit and the second monitoring unit.

10. The leak detection system of claim 9, wherein the master monitoring unit is configured to provide an indication of a minor leak if only one of the first monitoring unit and the second monitoring unit indicates the leak, and is configured to provide an indication of a major leak if both of the first monitoring unit and the second monitoring unit indicate the leak.

11. The leak detection system of claim 7, wherein the at least one electrical characteristic of the first portion includes a resistance and a capacitance.

12. A leak detection system for high-temperature aerospace fluid ducts, comprising:
    a rigid metal fluid duct;
    an electrically conductive polymer disposed around the rigid metal fluid duct, the electrically conductive polymer configured to melt in response to a leak of high-temperature fluid from the rigid metal fluid duct;
    a sensor configured to monitor at least one electrical characteristic of the electrically conductive polymer; and
    a layer of insulation disposed between the electrically conductive polymer and the rigid metal fluid duct;
    wherein the electrically conductive polymer includes a first layer and a second layer.

13. The leak detection system of claim 12, wherein the first layer is disposed closer to the rigid metal fluid duct than the second layer, and wherein a melting point of the first layer is higher than a melting point of the second layer.

14. The leak detection system of claim 12, wherein a dielectric layer is disposed between the first layer and the second layer, and wherein the first layer, the second layer, and the dielectric layer are configured as a capacitor having a capacitance.

15. The leak detection system of claim 14, wherein the at least one electrical characteristic of the electrically conductive polymer includes the capacitance.

16. The leak detection system of claim 12, wherein the layer of insulation thermally insulates the electrically conductive polymer from the rigid metal fluid duct.

17. The leak detection system of claim 16, wherein the layer of insulation is configured to facilitate flow of high-temperature fluid from the leak to the electrically conductive polymer.

18. The leak detection system of claim 12, wherein a total resistance of the electrically conductive polymer corresponds to a resistance of the first layer and a resistance of the second layer.

19. The leak detection system of claim 18, wherein the at least one electrical characteristic includes the total resistance.

20. The leak detection system of claim 19, wherein a dielectric layer is disposed between the first layer and the second layer; the first layer, the second layer, and the dielectric layer are configured as a capacitor having a capacitance; and the at least one electrical characteristic includes the total resistance and the capacitance.

21. The leak detection system of claim 20, wherein a melting point of the electrically conductive polymer is lower than a maximum expected surface temperature of the rigid metal fluid duct.

22. A leak detection system for high-temperature aerospace fluid ducts, comprising:
- a rigid metal fluid duct;
- an electrically conductive polymer disposed around the rigid metal fluid duct, the electrically conductive polymer configured to melt in response to a leak of high-temperature fluid from the rigid metal fluid duct;
- a sensor configured to monitor at least one electrical characteristic of the electrically conductive polymer; and
- a layer of insulation disposed between the electrically conductive polymer and the rigid metal fluid duct;
- wherein a melting point of the electrically conductive polymer is lower than a maximum expected surface temperature of the rigid metal fluid duct.

23. The leak detection system of claim 22, wherein the maximum expected surface temperature is at least 500 degrees Celsius.

24. The leak detection system of claim 22, wherein the maximum expected surface temperature is at least 650 degrees Celsius.

25. A method of detecting leaks in a high-temperature aircraft fluid duct, comprising:
- monitoring at least one electrical characteristic of an electrically conductive polymer, the electrically conductive polymer disposed around the high-temperature aircraft fluid duct;
- wherein the at least one electrical characteristic has a first value determined before a leak of high-temperature fluid occurs and a second value determined after the leak of high-temperature fluid occurs, a difference between the first value and the second value resulting at least partially from the electrically conductive polymer melting as a result of the leak of high-temperature fluid;
- wherein the electrically conductive polymer includes a first portion that is disposed around a first zone of the high-temperature aircraft fluid duct; the electrically conductive polymer includes a second portion that is disposed around a second zone of the high-temperature aircraft fluid duct; and, the first portion of the electrically conductive polymer is disposed at least partially around a joint of the high-temperature aircraft fluid duct and the first portion includes a higher melting point than the second portion.

* * * * *